March 19, 1940.  F. L. DIETERICH  2,193,808
CEMENTING PRACTICE FOR EARTH WELLS
Filed July 27, 1938
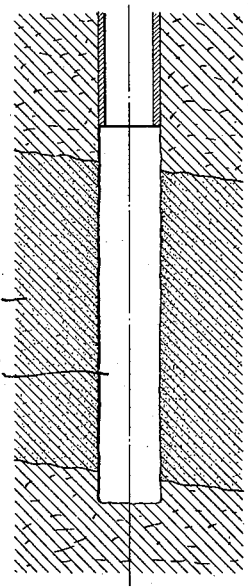
FIG_1_
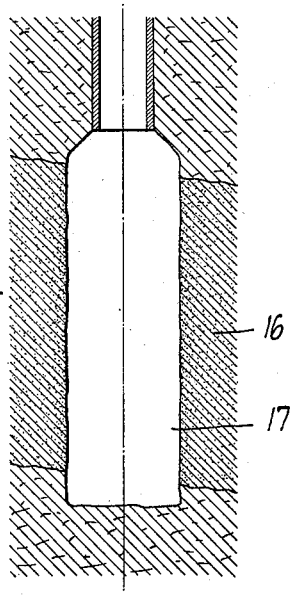
FIG_2_
FIG_3_  FIG_4_  FIG_5_
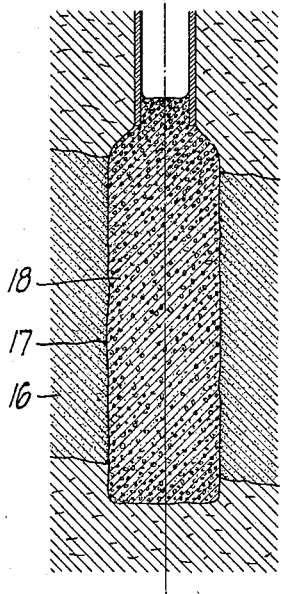 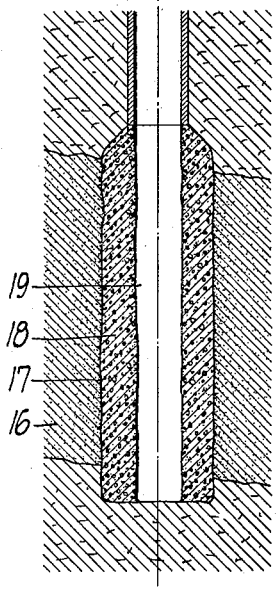 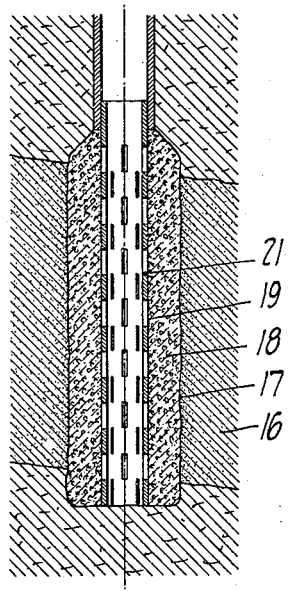
INVENTOR
Francis L. Dieterich
BY
ATTORNEY Patented Mar. 19, 1940

2,193,808

UNITED STATES PATENT OFFICE 2,193,808

CEMENTING PRACTICE FOR EARTH WELLS

Francis L. Dieterich, Los Angeles, Calif., assignor to The Dow Chemical Company, Midland, Mich., a corporation of Michigan Application July 27, 1938, Serial No. 221,536

2 Claims. (Cl. 166—21)

This invention relates generally to the practice of applying self setting plastic cement or concrete mixtures to earth wells. More particularly it relates to such practice as applied to oil or gas wells, particularly where it is desired to have a strainer located within a productive stratum.

It is an object of the invention to make possible formation of a porous wall within an oil or gas well, capable of operating as a strainer. More particularly it is an object of the invention to provide a method involving use of a particular type of a cement, which when subjected to acid, will form a porous structure.

Further objects of the invention will appear from the following description in which the preferred embodiment of the invention has been set forth in detail in conjunction with the accompanying drawing.

Referring to the drawing:

Figs. 1 to 5 inclusive are cross-sectional views in side elevation, showing various stages of a method incorporating my invention, where it is desired to provide a strainer in the lower end of a well.

In practicing the present invention I make use of an acid resistant cement mix such as a Portland cement mortar, together with balls or fragments of a material which can be readily eaten away by acid, particularly calcium carbonate. The Portland cement mortar may use conventional proportions of cement and a relatively finely divided aggregate like sand, which is not readily attacked by ordinary acids, or if desired pure Portland cement can be employed. The calcium carbonate balls or fragments are introduced in such sizes and quantity that in the final hardened mass they are in contact, whereby application of an acid will eat away the calcium carbonate to form a honey-combed or porous structure.

Ordinary commercial sources of calcium carbonate can be employed, without purification. Thus I can employ limestone fragments, fragments which have been rounded, or balls of calcium carbonate prepared from finely divided material.

Referring to the procedure as illustrated in Figs. 1 to 5 inclusive, it is presumed that an oil well has been drilled into the production zone 16 and that it is desired to produce from this zone, through a porous strainer. The first operation is to ream the hole 17 to a larger diameter as indicated in Fig. 2, within the production zone. The next operation illustrated in Fig. 3, is to fill the entire bottom end of the well with a solid plug 18, consisting for example of a wet mix of Portland cement mortar and fragments or balls of calcium carbonate, as previously described. After this plug is set, a hole 19 is drilled down through the same, as shown in Fig. 4.

As shown in Fig. 5 a slotted liner 21 is now set within the opening 19, and acid is introduced whereby acid penetrates through the slots in the liner, to attack the calcium carbonate fragments or balls in the concrete. As a result of the acid action, the fragments or balls of calcium carbonate are eaten away, thereby leaving a honey-combed structure through which the oil from the zone 16 may flow.

As an example of suitable practice, the Portland cement mortar may vary from pure cement to mixtures containing one part cement to three parts sand (by volume) or pure Portland cement. The fragments of balls of calcium carbonate may be of the order of from $\frac{1}{16}$ to $\frac{1}{4}$ inch in diameter and in amounts such that the voids between the fragments are fairly well filled with the hardened mass, without destroying the desired contacts between the coarse fragments for rapid penetration of the acid. In place of calcium carbonate it is possible to employ other materials which can be readily eaten away by acid, such as magnesium carbonate. In addition to forming plain mixtures of calcium carbonate and Portland cement, I can introduce into such a mixture coarse aggregate material such as gravel, which is not attacked by acid, whereby when the cement mix is eaten away by acid, the gravel is permitted to remain.

This application is a continuation in part of my co-pending application Serial Number 183,249, filed January 4, 1938.

I claim:

1. A method of forming a well strainer in situ comprising introducing concrete between a productive zone and a well, the concrete including fragments or balls of calcium carbonate, and then acidizing said concrete to eat away the balls or fragments of calcium carbonate, to render it porous.

2. In a method of cementing earth wells, introducing into the well a mixture consisting of a coarse aggregate material which is not destroyed by action of acid together with Portland cement and a relatively large percentage of calcium carbonate, permitting said mixture to set to form side walls within the well, and then subjecting the hardened structure to the action of acid whereby the mixture of Portland cement and calcium carbonate is destroyed to leave the aggregate material.

FRANCIS L. DIETERICH.